United States Patent [19]
Tanaka et al.

[11] 3,878,058
[45] Apr. 15, 1975

[54] RECOVERY OF ALKYLVINYLETHER BY EXTRACTIVE DISTILLATION OF A FEED CONTAINING ONLY TRACE AMOUNTS OF WATER

[75] Inventors: Kazuaki Tanaka; Yasuto Ishida; Mamoru Sato; Hidetaka Kishimoto; Kimiyoshi Yanagi, all of Yokkaichi, Japan

[73] Assignee: Kyowa Yuka Kabushiki Kaisha, Tokyo, Japan

[22] Filed: Feb. 1, 1973

[21] Appl. No.: 328,804

[30] Foreign Application Priority Data
Feb. 5, 1972  Japan................................ 47-12569

[52] U.S. Cl. ..................... 203/63; 203/50; 260/616
[51] Int. Cl.............................................. B01d 3/34
[58] Field of Search .................. 203/64, 63, 57, 50; 260/616

[56] References Cited
UNITED STATES PATENTS
2,559,519  7/1951  Smith et al........................... 203/64
2,779,720  1/1957  Tanona............................... 260/616
3,287,235  11/1966  Statman............................. 260/616

Primary Examiner—Norman Yudkoff
Assistant Examiner—Frank Sever
Attorney, Agent, or Firm—Wolder & Gross

[57] ABSTRACT

The present invention relates to means for isolating an alkylvinylether from a mixture of alkylvinylether and aliphatic alcohol (hereinafter designated as vinylether and alcohol, respectively) which are hardly separable by mere rectification treatment due to the azeotrope or the close boiling point. More particularly, the present invention relates to isolation and purification of vinylether from a mixture of vinylether and alcohol by adding a third component consisting of a monoalkylether substituent of glycol. The resulting combined mixture is then subjected to extractive distillation to isolate vinylether therefrom.

9 Claims, 1 Drawing Figure

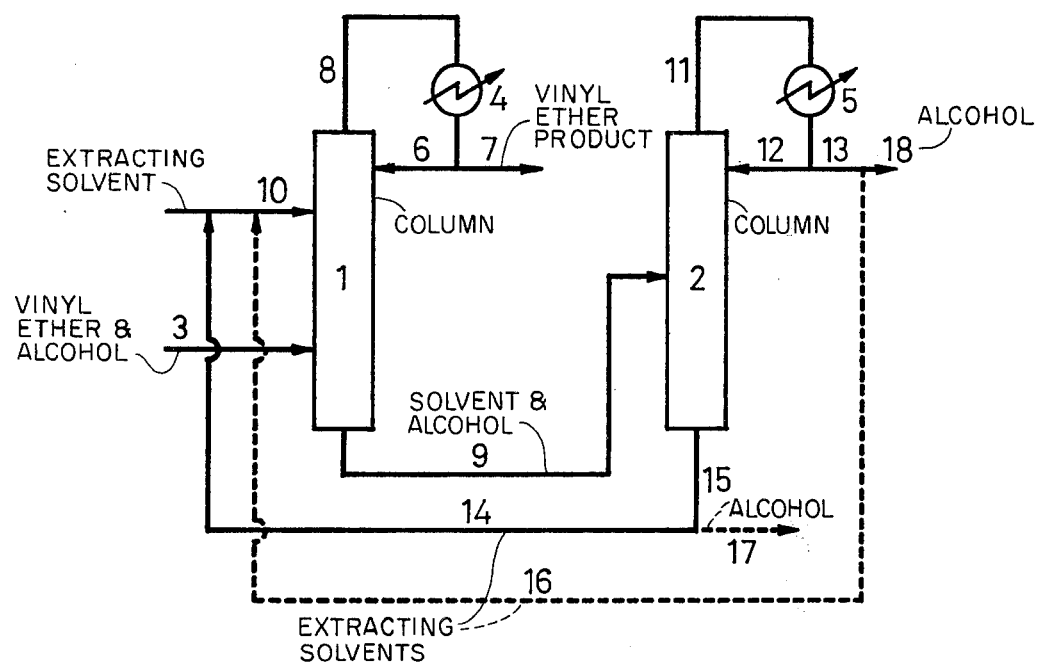

RECOVERY OF ALKYLVINYLETHER BY EXTRACTIVE DISTILLATION OF A FEED CONTAINING ONLY TRACE AMOUNTS OF WATER

Known processes for producing such vinylether are exemplified by (1) a process of adding alcohol to acetylene, (2) reacting ethylene with alcohol, and (3) a process of decomposing acetal. However, the aforesaid processes have the disadvantage of a low equilibrium ratio so that the reaction product contains considerable amounts of unreacted alcohol. When vinylether contains unreacted alcohol, the alcohol is liable to inhibit polymerization reactions and gives rise to unfavorable side reactions. It is therefore necessary to remove alcohol from vinylether. In order to remove the alcohol, various processes for purifying vinylether have been proposed.

Among the known purification processes for vinylether, the most commonly used involves the extraction of alcohol with water as a solvent. This process has, however, the disadvantages that it is impossible to apply it to the purification of a mixture containing an alcohol having a low solubility in water. This process is usable only for the purification of vinylethers having not more than 6 carbon atoms. In addition, this process has the disadvantage that vinylethers, particularly lower alkylvinylethers are easily hydrolyzed in the presence of a traceable amount of acid. Furthermore, this process has the disadvantages of a low recovery ratio of vinylether, and of complicated alcohol recovering steps.

In view of the problems of the prior art set forth above, it is an object of the present invention to provide a process for purifying vinylether to a high purity with a good yield and in a simple manner.

Another object of the present invention is to provide a process for purifying vinylether which can be applied to various types of vinylethers.

According to the present invention, there is provided a process for purifying vinylether from a mixture of alkylvinylether and aliphatic alcohol by adding a third component consisting of at least one monoalkylether substituent of glycol as an extracting solvent and then subjecting said mixture to distillation. According to the process of the present invention, it is possible to easily isolate vinylether and alcohol of high purity and in good yield as compared with the conventional processes using water as a third component.

The extracting solvents which may be used for the purpose of the present invention have superior properties such as high selectivity, easy separation, good heat-stability, inactivity to raw material as well as reduced toxicity and corrosion. The present extracting solvents are selected from compounds having the formula:

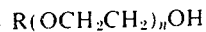

wherein R represents an alkyl group and $n$ represents an integer of from 1 to 3. These compounds have carbon atoms of from 3 to 14 and are exemplified by ethyleneglycol monomethylether, ethyleneglycol monoethylether, ethyleneglycol monobutylether, ethyleneglycol monopentylether, ethyleneglycol monohexylether, diethyleneglycol monomethylether, diethyleneglycol monoethylether, diethyleneglycol monobutylether, diethyleneglycol monopentylether, diethyleneglycol monohexylether, triethyleneglycol monomethylether, triethyleneglycol monoethylether, triethyleneglycol monobutylether, etc.

The selection of extracting solvent is based upon the boiling point of the starting mixture to be used. Any and all substances having a boiling point of at least 15°C higher than the boiling point of the vinylether to be separated, and having a difference in boiling point between the aliphatic alcohol of the mixture and itself of greater than 15°C can be used. The solvent may be used solely or in combination.

Vinylethers which may advantageously be purified by the process of the present invention are those having 3–16 carbon atoms. The process of the present invention can particularly be applicable to vinylethers having 4–10 carbon atoms.

In carrying out the process of the present invention the distillation procedure is suitably determined by various conditions such as, for example, the starting mixture, the boiling point of the extracting solvent to be used and the like. Distillation may be effected under various suitable pressure conditions, i.e., under reduced, normal or elevated pressure. Temperatures sufficient to distill off the vinylether are employed, and generally range from 5° to 200°C depending upon the components of the mixture being distilled.

According to the process of the present invention, both the vinylether and alcohol isolated have a purity of higher than 98%, and they can be quantitatively recovered. The purified and recovered vinylether is usable as a final product without any after-treatment. it is possible to reuse the recovered alcohol as a reaction material.

The present process is particularly effective in separating alkyl vinylethers from aliphatic alcohols containing 1 to 14, preferably 1 to 8 carbon atoms. The amount of extracting solvent added to the mixture to be separated is normally about 0.5 to 500, preferably 10 to 200 weight per cent based on the amount of alkylvinylether contained in said mixture undergoing separation.

In carrying out the purification of vinylether according to the process of the present invention, it has been confirmed that neither side reaction nor polymerization which may injure the starting materials occur. In other words, the extracting solvent used does not react with either the vinylether or alcohol. It has also been confirmed that hydrolysis does not occur because water is not present in the course of purification. It has further been confirmed that the polymerization of vinylether does not occur because the vinylether is diluted with the extracting solvent. It is therefore possible to quantitatively recover each and all of the starting materials and of the extracting solvent without addition of stabilizer or polymerization-inhibitor, or the like.

The extracting solvent used for the process of the present invention is stable. The solvent combined with alcohol which is taken out from the bottom of the extractive distillation column can easily be isolated from the mixture by conventional rectification and the recovered solvent can be reused for the purification. The recovery ratio of the extracting solvent is higher than 99% and the loss of the extracting solvent is negligible.

The process of the present invention is illustrated by the accompanying drawing which shows a preferred embodiment and does not limit the scope of the present invention.

A mixture of vinylether and alcohol is fed by pipe 3 into the middle part of extractive distillation column 1 where the mixture is counterflowed so that it is placed in contact with an extracting solvent circulated into said extractive distillation column through pipe 10. The resultant mixture is subjected to the extractive distillation.

Vinylether is evaporated from the top of the column through pipe 8 and liquefied in condenser 4. A part of the liquefied vinylether is discharged from the system by means of pipe 7; while the remaining part of the liquefied vinylether is refluxed to extractive distillation column 1 by means of pipe 6. A mixture of the extracting solvent and alcohol is taken out from the bottom of extractive distillation column 1 by means of pipe 9 and fed into the middle part of solvent-recovering column 2 where alcohol and extracting solvent are separated from each other.

When the boiling point of alcohol is lower than that of the extracting agent, alcohol is distilled from the top of column 2 by means of pipe 11 and is liquefied in condenser 5. A part of the liquefied alcohol is taken out from the system by pipes 13 and 18; while the remaining part is refluxed to solvent-recovering column 2 by means of pipe 12. The extracting agent is taken out from the bottom of column 2 and is circulated through pipes 15 and 14 to distillation column 1.

On the other hand, when the boiling point of alcohol is higher than that of extracting solvent, the separation in solvent-recovering column 2 proceeds according to the scheme shown by dotted line. In other words, the isolation procedure is carried out in a similar manner to that described hereinbefore until the substance obtained from the bottom of extractive distillation column 1 is fed through pipe 9 into a middle part of solvent-recovering column 2. After this, the extracting solvent is distilled by means of pipe 11 from the top of solvent-recovering column 2 and liquefied in condenser 5. A part of the liquefied extracting solvent is circulated by passing through 13 and 16 into extractive distillation column 1; while the remaining part is refluxed through 12 to solvent-recovering column 2. Alcohol is taken out from the bottom of column 2 by means of pipes 15 and 17.

The present invention is illustrated by the following non-limitative examples.

EXAMPLE 1

In the accompanying drawing, columns packed with macmahorn were used as extractive distillation column 1 (inner diameter 25 mm; height 1500 mm) and solvent-recovering column 2 (inner diameter 25 mm; height 1200 mm). An inlet for charging raw materials and another inlet for charging an extracting solvent were respectively provided at a point of two-thirds and one-third downwardly from the top of the extractive distillation column. By means of these apparatus, the separation of a mixture of isobutyl-vinylether (89.0%), isobutyl alcohol (10.3%) and impurities was carried out. Ethyleneglycol monoethylether (ethylcellosolve) was used as the extracting solvent.

The said mixture and ethylcellosolve were fed into the extractive distillation column at a rate of 52.3 g/hr and at a rate of 69.4 g/hr respectively from the corresponding inlet to effect the extractive distillation.

A mixture of isobutyl-vinylether (99.3%), isobutyl alcohol (0.2%) and ethyl-cellosolve (0.01%) was distilled from the top of extractive distillation column 1 at a rate of 47.0 g/hr.

A mixture of the extracting solvent and alcohol was taken out from the bottom of column 1 at a rate of 74.7 g/hr and the mixture was then fed into the middle part of solvent-recovering column 2. Isobutyl alcohol was distilled at a rate of 3.7 g/hr from the top of column 2, and ethylcellosolve was taken out from the bottom of column 2 at a rate of 69.0 g/hr.

The purities of the thus obtained isobutyl alcohol and ethylcellosolve were 99.5% and 99.8%, respectively.

EXAMPLE 2

A mixture of ethyl alcohol and vinylether was subjected to separation by means of a similar apparatus to that described in Example 1. Ethyleneglycol monomethylether (methylcellosolve) was used as the extracting solvent.

A mixture of ethylvinylether (96.1%), ethyl alcohol (3.6%) and impurities was fed as the starting material from the charging inlet at a rate of 137.4 g/hr, and methylcellosolve was fed at a rate of 57.3 g/hr from the corresponding charging inlet to effect the extractive distillation. The liquid obtained from the bottom of extractive distillation column 1 was fed into the middle part of solvent-recovering column 2 to carry out the recovering distillation.

The resultant mixture of ethylvinylether (99.2%), methylcellosolve (0.08%) and ethyl alcohol (0.2%) was recovered at a rate of 132 g/hr from the top of the extractive distillation column; while ethyl alcohol (purity 98.1%) was recovered at a rate of 5.4 g/hr from the top of the solvent-recovering column. From the bottom of the solvent-recovering column, methylcellosolve (purity 99.1%) was obtained at a rate of 57.0 g/hr.

The recovery ratio of ethylvinylether was 99.1% and the loss of methylcellosolve was 0.8%.

EXAMPLE 3

A mixture of 2-ethylhexylvinylether (85%), 2-ethylhexylalcohol (14.3%) and impurities was subjected to separation by means of a similar apparatus to that described in Example 1. Diethyleneglycol monobutylether was used as the extracting solvent. The said mixture and extracting solvent was fed into extractive distillation column 1 at a rate of 105.1 g/hr and at a rate of 200.3 g/hr, respectively, to effect the extractive distillation under reduced pressure of 20 mmHg.

As a result, a mixture consisting of 2-ethylhexylvinylether (98.5%), 2-ethylhexylalcohol (0.3%) and diethyleneglycol monobutylether (0.02%) was recovered at a rate of 97.7 g/hr from the top of the extractive distillation column, 2-ethylhexylalcohol (purity 98.0%) was recovered at a rate of 11.1 g/hr from the top of the solvent-recovering column; while from the bottom of the solvent-recovering column the extractive solvent (purity 98.1%) was obtained at a rate of 203.1 g/hr.

We claim:

1. A process for recovering alkylvinylether from a mixture of alkylvinylether and aliphatic alcohol which comprises adding in the absence of other than trace amounts of water as an extracting solvent at least one monoalkylether substituent of glycol of the general formula:

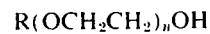

wherein R represents an alkyl group and n represents an integer of from 1 to 3, and subjecting the resultant mixture to distillation conditions to separate said alkylvinylether.

2. The process of claim 1 in which said solvent has a boiling point at least 15°C higher than the boiling point of said alkylvinylether, and differs in boiling point from said alcohol by more than 15°C.

3. The process of claim 2 in which said solvent has 3 to 14 carbon atoms.

4. The process of claim 2 in which said solvent is selected from the group consisting of ethyleneglycol monomethylether, ethyleneglycol monoethylether, ethyleneglycol monobutylether, ethyleneglycol monopentylether, ethyleneglycol monohexylether, diethyleneglycol monomethylether, diethyleneglycol monoethylether, diethyleneglycol monobutylether, diethyleneglycol monopentylether, diethyleneglycol monohexylether, triethyleneglycol monomethylether, triethyleneglycol monoethylether, and triethyleneglycol monobutylether.

5. The process of claim 1 in which said alkylvinylether has 3 to 16 carbon atoms.

6. The process of claim 1 wherein said vinylether has 3 to 16 carbon atoms, said solvent has 3 to 14 carbon atoms and said aliphatic alcohol has 1 to 14 carbon atoms.

7. The process of claim 1 wherein 0.5 to 500 weight percent of said solvent compound based on weight of alkylvinylether is added to the mixture to be separated.

8. The process of claim 1 wherein said alkylvinylether is distilled overhead from said mixture and recovered as a 98+%, pure stream, passing the undistilled mixture of alcohol and extracting solvent to a separate distillation zone, and subjecting same to distillation to separately recover alcohol and extracting solvent from said distillation zone.

9. A process for recovering aliphatic alkylvinylether from a mixture of alkylvinylether and aliphatic alkanol, which comprises distilling the mixture in the absence of other than trace amounts of water in a distillation column while adding an organic solvent having the general formula: $R(CH_2CH_2)nOH$, where $n$ is an integer from 1 to 3, R is a lower alkyl, said solvent having a boiling point at least 15°C higher than the boiling point of said aliphatic alkylvinylether and differing in boiling point from said aliphatic alkanol by at least 15°C, and recovering the aliphetic alkylvinylether from the top of the column while recovering a mixture of the aliphatic alkanol and the organic solvent from the bottom of the column.

* * * * *